Figure 1:
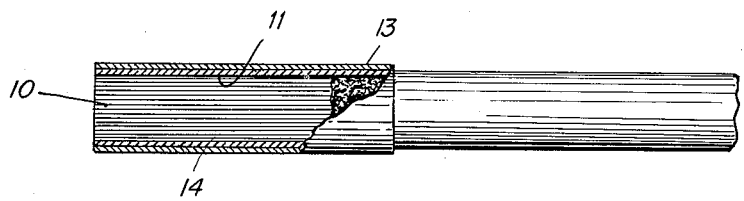

3,101,723
FIBROUS CIGARETTE FILTER
Robert B. Seligman and Carroll Toepffer, Richmond, Va., assignors to Philip Morris Incorporated, New York, N.Y., a corporation of Virginia
Filed Nov. 15, 1960, Ser. No. 69,411
5 Claims. (Cl. 131—208)

This invention relates to a novel and improved filter. More particularly, it relates to a filter for tobacco smoke having enhanced efficacy in reducing the concentration of certain fractions in the vapor phase of the smoke.

Most filters employed in conjunction with tobacco smoking articles provide principally a physical separation, i.e., they remove a portion of the particulate matter from the smoke which passes through them. To aid in the separation of particulate matter, the filter, which is commonly fabricated of a fibrous or fiberlike material, such as cellulose acetate or like yarn or filaments, or creped or crimped paper, or shredded material such as tobacco, is so constructed as to bring a maximum surface area in contact with the smoke passing through the filter. Such embodiments serve more or less efficiently to reduce the concentration of particulate matter in the smoke, but have little, if any, effect on the substances comprising the gas phase of the smoke.

It has been proposed to increase the efficacy of tobacco smoke filters by increasing the surface area with which the smoke is contacted through depositing in the filter and upon the surface of the filaments comprising it a powder, which may, exemplarily, be carbon. Thus in Patent 2,881,770 it is taught that the type of carbon employed for such purpose is not a critical factor, but that the form of the carbon (a powder) is important. This patent proposes to bind the powder to the filter filaments through use of a plasticizer such as dimethoxyethylphthalate or methylphthalylethylglycollate. These substances tend, however, to poison or deactivate activated carbon.

It has also been recognized in the art that the presence in the filter of activated charcoal removes certain materials from the smoke, which are present in gaseous form. Patent 2,801,638 stresses the importance of incorporating the activated charcoal in the filter in such a manner that it does not become deactivated and teaches that the use of glue or the like is entirely unsatisfactory for this reason. The patent therefore proposes to form the filtering medium of paper and to incorporate the activated charcoal in the fiber furnish prior to or during paper sheet formation. This mode of preparation is attended by many disadvantages, among them that the granular size of the activated charcoal is limited, coarser materials tending to shed, and rendering the filter rod more difficult to shape smoothly, and finer particles having too large a proportion of the particle surface area imbedded in the fiber mass and tending to darken the filter excessively.

It has also been proposed in Patent 2,325,386 to secure particles of adsorbent material such as activated charcoal, activated aluminum and silica gel to vegetable parchment with natural rubber latex. The latex, however, contributes an undesirable and offensive odor to the product and imparts an unpleasant taste to the smoke passing through the filter.

The incorporation of activated carbon in filters for smoking articles has been proposed heretofore but commonly under conditions which tended to deactivate, mask, or otherwise inhibit or interfere with the best functioning of the activated carbon or affect the desirable flavor or character of the smoke passing through the filter, or to affect adversely the odor or other character of the product.

It is accordingly an object of this invention to provide an improved filter for tobacco smoke, and particularly a filter having activated carbon in active form dispersed therein. Another object is to provide an improved means of securing activated carbon in a smoke filter. Still another object is to provide a means for securing activated carbon in a tobacco smoke filter, which means permits employment of activated carbon in granular dimension of a wider range than that permitted by the prior art. An additional object is to provide an adhesive for securing activated carbon to a filtering medium, which adhesive does not mask or otherwise deactivate the activated carbon. Another object is to provide a material for securing activated carbon to a filtering medium, which material does not adversely affect the character or quality of the smoke passed through the filter or the character of the filter itself. Other objects will in part be obvious and will in part appear hereinafter.

Figure 2:
Figure 3:
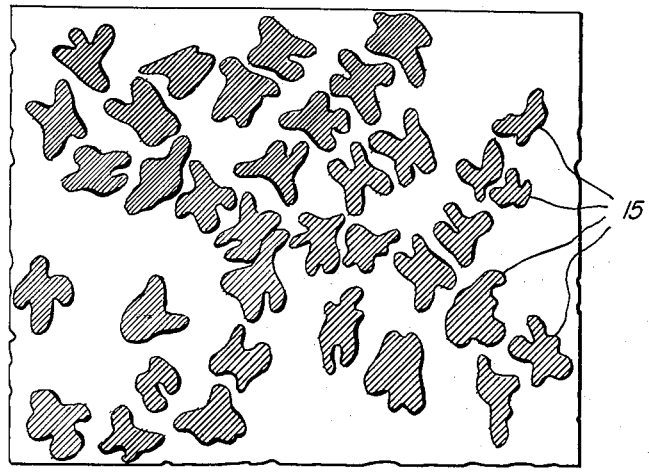

The filter means is of particular advantage in association with a cigarette as is shown in somewhat general manner in the accompanying drawings. In such drawings FIG. 1 illustrates a cigarette in which the filter medium is a filament type; and in FIG. 2 the filter medium is composed of sheet material. FIG. 3 is a fragmentary cross-sectional view on a greatly magnified scale of the filter means of FIG. 1 showing the character of the filaments and the fact that the adhesive employed for securing the carbon particles does not materially affect the cross-sectional shape of the filaments nor cause them to merge laterally and reduce the exposed surface areas.

We have found that the objects of the invention are simply and efficiently attained by securing the activated carbon within and upon the surfaces of the filtering medium by means of a mixture of polyvinyl pyrrolidone and a polyhydric alcohol, so that the carbon is superficially dispersed in the filtering medium.

The polyvinyl pyrrolidone (hereinafter referred to as PVP), obtainable by polymerization of N-vinyl-alpha-pyrrolidone, may have a degree of polymerization (commonly referred to by Fikentscher K value) of from K15 to K90, although a degree of polymerization corresponding to about K15 to K50, and particularly to K30 or thereabouts, is generally preferred. Of the polyhydric alcohols the glycols, including the glycol ethers, are preferred. Particularly suitable are glycerine, diethylene glycol, triethylene glycol, propylene glycol, polyethylene glycols, hexanediol and sorbitol. Mixtures of polyhydric alcohols may, if desired, be used.

In the practice of this invention, from about 0.25 to about 8 parts of PVP may be employed per part of polyhydric alcohol, a preferred range of proportion being between about 1:1 and about 4:1. The most suitable ratio may vary to small extent according to the polyhydric alcohol selected and the degree of polymerization of the PVP, but it will be found that ratios within the range just stated are generally suitable and that the most desirable ratio for particular ingredients may readily be determined by simple trial testing. The admixture of PVP and polyhydric alcohol is conveniently carried out in an aqueous medium, whereupon the mixture becomes tacky and adhesive, the extent depending upon the degree of polymerization of the PVP, the particular polyhdric alcohol, and the proportions selected. The amount of water is preferably regulated so that the adhesive solution has a total solids content of from about 20% to about 60%. We have found that adhesive deposited from a solution containing less than 20% solids presents a practical matter in commercial operation of providing sufficient time for drying, and that a solution containing more than 60% solids tends to become too viscous to handle conveniently.

The range of application of adhesive to filtering medium may vary from about 5% to about 20% based on the total weight of the finished filter. 9% to 12% adhesive is preferred. Less than 8% adhesive tends to afford only marginally adhesive properties and amounts larger than 15% tend to spot the filter plugs.

The adhesive in the amounts described serves advantageously to harden the plug so that no other plasticizer or hardener is needed. The adhesive of this invention does not distort the filter fibers, however, as do triacetin, dimethoxyethylphthalate, methylphthalylethylglycollate (sometimes referred to as M-17), and other materials common for this purpose. Moreover, we have discovered that, surprisingly, the PVP-polyhydric alcohol adhesive of this invention does not poison the activated carbon, whereas common hardeners such as triacetin, dimethoxyethylphthalate and methylphthalylethylglycollate do have this disadvantage. And we have further found that our adhesive on a filter has no adverse effect on the flavor and does not effect in itself removal of particulate or gas phase smoke components.

The activated carbon employed in the filter of this invention may be any suitable nutshell carbon, suitably Barneby-Cheney nut carbon, Columbia L, Columbia LC (coke base) carbon, etc. The mesh size is largely a matter of choice, limited principally at the upper end of the size range by the tendency of the filter rod to become misshapen and difficult to manufacture and at the lower end of the range by the tendency of the particles to become imbedded in the adhesive with consequent loss of efficiency. In general, carbon between 48 and 150 United States Standard mesh size (passing through a 48 mesh and retained on a 150 mesh) and having a maximum of 15% greater than 48 mesh and 15% less than 150 mesh is suitable. In this size range, the carbon particles are found, surprisingly, to be held in the filter by point contact, with virtually no masking or reduction in surface area by the adhesive. A preferred range of particle size is a maximum of 5% greater than 48 mesh and 5% less than 150 mesh.

An amount of activated carbon equivalent to from about 15% to about 50%, based on the weight of the finished filter, may be suitably employed, a preferred range being from about 25 to about 45%. The preferred quantity or proportion of carbon may of course vary somewhat according to the type of tobacco or weight of the medium to be employed in the smoking article and according to the desired effect on flavor. Greater amounts of carbon will tend to remove correspondingly greater fractions of gas phase compounds from the smoke with some consequent effect on taste. It will be apparent to those skilled in the art from routine testing what quantity of activated carbon is best suited to meet the requirements for a particular product.

The filtering medium which may be employed in the filter of this invention may be any of those common in the art, varying as to physical form and composition, including yarns such as cellulose acetate, butyrate and the like, asbestos, paper, including super calendered glassine (which, like other non-absorbent materials, is economical of adhesive), non-woven fabric, tobacco, sheet material, etc. Considering a cellulose acetate filament filtering medium as illustrative, the filament preferably has a non-circular shape in cross section, as for example a generally H-shape such as that disclosed in U.S. 2,825,120. Filaments of such type have greater surface area and more lateral resilience. Also the filaments may be crimped. The denier per filament and total denier will vary with the quantity of carbon desired, the desired particulate efficiency of the filter, and the desired resistance to draw. Thus, as is known to those skilled in the art, a filter plug having high particulate efficiency and consequent high resistance to draw may have a denier per filament of 2.5 and total denier of 75,000, while a plug with low resistance to draw and consequently lower particulate efficiency may have a denier per filament of 8 and a total denier of 65,000. For carbon loadings of 30-50%, exemplary tow characteristics are suitably denier per filament of 5, total denier of 50,000; for carbon loadings of 18-35%, denier per filament of 5 and total denier of 60,000 are illustratively satisfactory.

The adhesive and carbon may be incorporated in the filter by any of a number of conventional means, the preferred means being subject to variation according to the nature of the filtering medium. The superior spraying and drying characteristics of the adhesive composition of this invention render this means of application, followed by application of activated carbon by dusting or blowing, particularly advantageous.

The following examples are intended to be illustrative and are not to be taken in a limiting sense.

EXAMPLE I

A high efficiency filter plug for removal of gaseous components is prepared in the following manner. A 5 denier per filament, 50,000 total denier crimped cellulose acetate tow is stretched and beaten in conventional apparatus. The tow while laterally distended is then passed under a spray gun, which applies 11% adhesive comprising equal parts of PVP K30 and triethylene glycol in 8 parts of water, and then proceeds directly through a dust chamber, where 44% activated carbon (Columbia LC), having a maximum of 3% greater than 48 mesh, 5% less than 150 mesh, is applied. The tow is then passed through squeeze rolls which assist in pressing the carbon into the adhesive. The treated tow is tubed in conventional plug-making equipment.

The filter rod material made as described above may be incorporated in any suitable desired plug length in a cigarette and in any conventional manner. It may be employed as the sole filter means or in association with filter plugs of other character, either plain or impregnated. FIG. 1 as an illustrative example shows a cigarette with a single filter plug 10 made in accordance with the present invention contained in its plug tube 11, the plug section being secured to the tobacco rod 13 by a tipping paper 14. The plug section may have a length of for example 12.5 mm.

EXAMPLE II

A filter plug according to the invention having a lower efficiency and lower resistance to draw than that of Example I is prepared in the following manner. The procedure of Example I is followed, except that 10.8% adhesive and 19% carbon are applied, the adhesive comprising 4 parts of PVP K30 and 1 part of glycerine in 6 parts of water. The cellulose acetate tow has a denier per filament of 4.5 and a total denier of 62,000. 7.5 mm. plugs cut from the rod have a resistance to draw of 0.7 inch of water.

EXAMPLE III

A preferred filter according to this invention is prepared from cellulose acetate tow having a denier per filament of 5 and a total denier of 60,000. 9.8% adhesive and 32% carbon are applied in the manner of Example I, the adhesive comprising 3 parts of PVP K30 and 1 part of triethylene glycol in 6 parts of water. 7.5 mm. plugs cut from the rod have a resistance to draw of 1.5 inches of water.

As has previously been noted, a particularly advantageous and surprising characteristic of the filters of this invention is that the carbon is secured to the filtering medium by point contact, and the adhesive does not mask or reduce the effective surface area of the activated carbon. In consequence, and as demonstrative of this advantage, the carbon and adhesive which inevitably adhere to the press rolls as in the process of Example I can be removed therefrom by scraping or doctoring and recycled or otherwise embodied in filters. No substantial loss in efficiency of the carbon in removing gas phase fractions is noted, showing the freedom from masking of the adhesive composition of this invention.

A further advantage of the adhesive of our invention is the fact that it serves to secure adequately the carbon particles to the surfaces of the filaments but does not materially soften or plasticize the filaments, which would cause them to merge together at various areas. Accordingly the longitudinal gas passages are retained and there is no substantial reduction in the carbon surfaces exposed to the gases. FIG. 3 is a reproduction of a photomicrograph (enlarged 500 diameters) of a cross sectional area of the filament type filter medium of the present invention, the filaments being indicated at 15. It may be noted that the filaments retain their individual character and they do not merge together into a continuous mass.

EXAMPLE IV

Three filters each having a total length of 20 mm. are prepared as follows:

A. A conventional filter of cellulose acetate tow having a denier per filament of 5 and a total denier of 60,000, containing no adhesive or carbon.

B. Staple acetate tow as in filter A, but containing 20 mg. of activated carbon (Columbia LC 48/150) and no adhesive deposited throughout a 12.5 mm. plug and having 3.75 mm. caps of staple acetate appended to each end.

C. Staple acetate tow as in filter A, but containing 20 mg. of reclaimed carbon from the press rolls of Example III (including 6.4% PVP and 2.1% triethylene glycol) deposited throughout a 12.5 mm. plug and having 3.75 mm. caps of staple acetate appended to each end.

A synthetic mixture of 6 gaseous substances set forth in Table A, are passed through the individual filters. The effluent is analyzed and the percent reduction in gas phase components of the synthetic mixture calculated. The comparative results (for 20 of each filter) are given in Table A.

*Table A*

| Filter | Isoprene | Methyl Acetate | Acetaldehyde | Methanol | Methyl Furan | Benzene |
|---|---|---|---|---|---|---|
| A—(Control—plain staple) | 10 | | | | 9 | 15 |
| B—(20 mg. C on 60 mg. staple Ace.) | 55 | 47 | 15 | 21 | 49 | 55 |
| C—(20 mg. Reclaimed C on 60 mg. staple Ace. cont. 6.4% PVP and 2.1% TEG) | 66 | 56 | 16 | 27 | 63 | 70 |

The data in Table A show the greater efficacy of the filter of this invention in effecting significant reduction of the gas phase substances as compared with the control of plain staple acetate. The table also shows that the reclaimed carbon is substantially as efficient as virgin carbon in reducing concentration and that the adhesive of this invention does not deactivate the carbon.

EXAMPLE V

Two filters according to this invention are prepared from a paper filtering medium employing absorbent filter paper which is crimped in accordance with customary practice and in long strip form with the corrugations extending longitudinally. Filter D contains 13.5% adhesive (3 parts PVP K30 to 18 parts TEG) and 27.2% Columbia LC carbon (48/150 mesh). Filter E is similarly prepared but contains 9.3% adhesive and 27.7% activated carbon. The adhesive is sprayed onto the surface of the paper and the carbon dusted on as a powder prior to forming into a filter rod. The thus-prepared paper is formed into a continuous covered filter rod by advancing the strip through a suitable funnel or horn in conventional manner whereby the paper is laterally crumpled with irregular longitudinally extending pleats following which in the continuous advance of the material an outer wrapper is applied. FIG. 2 shows a plug section 16 of such type filter assembled to a cigarette in a manner generally similar to that of FIG. 1. In the cases of filters D and E the filter plugs had a length of 7.5 mm.

The method of Example IV is employed to determine the percent reduction of gas phase material passed through the filters, and the results reported in Table B are comparable to those in Table A.

*Table B*

| Filter | Isoprene | Methyl Acetate | Acetaldehyde | Methanol | Methyl Furan | Benzene |
|---|---|---|---|---|---|---|
| D—(13.5% adhesive and 27.2% activated carbon) | 73 | 67 | 29 | 22 | 68 | 75 |
| E—(9.3% adhesive and 27.7% activated carbon) | 67 | 62 | 24 | 21 | 58 | 69 |

EXAMPLE VI

Filters according to this invention are made from sheet materials, such as papers of the following type: 25 lb. pharmacy wrap (bleached sulfite), 25 lb. kraft wrapping, 25 lb. glassine. Suitable filters are obtained by use of 15% adhesive solids and 35% activated carbon (48/150). Reduction in concentration of gas phase components passed through the filters is comparable to that of the other filters according to this invention.

It is generally desirable to employ somewhat greater amounts of adhesive when the paper or other filtering medium is relatively highly porous or absorbent and the amount of adhesive may be commensurately reduced when applied to less porous materials.

EXAMPLE VII

A filter plug according to this invention is prepared according to the procedure of Example I, except that propylene glycol is employed as the polyhydric alcohol constituent of the adhesive in the proportion of 1 part to 3 parts of PVP K15. Aqueous dilutions containing 40%, 50% and 60% solids are applied to the tow in an amount corresponding to 10% by weight of the tow. Satisfactory adhesion of carbon to the tow is obtained. Better adhesion results from use of the preferred triethylene glycol as the polyhydric alcohol component of the adhesive.

EXAMPLE VIII

A filter plug not according to this invention is prepared according to the procedure of Example I, except that the adhesive comprises solely PVP K30 with no polyhydric alcohol. Plugs made in this manner appear to process normally, but the finished product is completely inadequate with respect to carbon retention on the filter material. It is thus demonstrated that an aqueous solution of PVP alone does not serve as an adequate adhesive and that the combination of a polyhydric alcohol with PVP is an essential part of this invention.

Cigarettes embodying filters according to this invention have been smoked and found to be generally more mild than comparable cigarettes employing a filter not containing activated carbon according to this invention.

While the filters of this invention have particular advantage in reducing the concentration of gas phase components in tobacco smoke, it is to be understood that their usefulness is not limited to such an application. Rather, as is shown by Tables A and D, filters embodying activated carbon dispersed superficially therein and secured by a mixture of PVP and polyhydric alcohol, as hereinbefore described, have wide application to reduce, generally or selectively, components from synthetic or natural mixtures of gases or vapors. Such applications of course depend on the adsorptive capabilities of activated carbon, which are well known to the art. The advantage in providing activated carbon so dispersed in

We claim:
1. A filter adapted to be used in conjunction with a smoking article which comprises a fibrous filtering medium, from about 15 to about 50% by weight of said filtering medium of activated carbon superficially dispersed in said filtering medium and a mixture causing adherence between said activated carbon and said filtering medium, said mixture comprising from about 5% to about 20% by weight of said filter and consisting of polyvinyl pyrrolidone having a degree of polymerization between about K15 and K90 and a polyhydric alcohol, the ratio between said polyvinyl pyrrolidone and said polyhydric alcohol in said mixture being between about 1:1 and about 4:1.

2. A filter according to claim 1 in which the polyhydric alcohol is glycerine.

3. A filter according to claim 1 in which the polyhydric alcohol is diethylene glycol.

4. A filter according to claim 1 in which the polyhydric alcohol is triethylene glycol.

5. A filter according to claim 1 in which the polyhydric alcohol is polyethylene glycol.

References Cited in the file of this patent

UNITED STATES PATENTS

| | | |
|---|---|---|
| 1,962,930 | Herrmann | June 12, 1934 |
| 1,996,216 | Schmidt | Apr. 1, 1935 |
| 2,307,088 | Whitely | Jan. 5, 1943 |
| 2,707,959 | Shelanski | May 10, 1955 |
| 2,881,770 | Touey | Apr. 14, 1959 |
| 2,908,280 | Touey | Oct. 13, 1959 |
| 3,016,907 | Rosenberg | Jan. 16, 1962 |

FOREIGN PATENTS

| | | |
|---|---|---|
| 1,111,207 | France | Oct. 26, 1955 |

OTHER REFERENCES

The Dyestuff Reporter, "Proceedings of the American Ass'n. of Textile Chemistry and Colorists," September 26, 1955, pages 702 to 704.